United States Patent
Asami

[19]

[11] Patent Number: 6,075,572
[45] Date of Patent: Jun. 13, 2000

[54] MULTI-DIMENSIONAL VIDEO FILTERS

[75] Inventor: Toru Asami, Machida, Japan

[73] Assignee: Kabushiki Kaisha Kenwood, Tokyo, Japan

[21] Appl. No.: 09/022,898

[22] Filed: Feb. 12, 1998

[30] Foreign Application Priority Data

Mar. 3, 1997 [JP] Japan ..................................... 9-061740

[51] Int. Cl.[7] .................................................. H04N 5/213
[52] U.S. Cl. .......................... 348/607; 348/617; 348/620; 348/622; 348/630; 348/701
[58] Field of Search ..................................... 348/607, 618, 348/619, 620, 622, 625, 627, 447, 606, 616, 617, 624, 630, 712, 702, 669, 670, 701, 683, 533; 382/260, 262; 364/724, 725, 726; 3418/413, 421; H04N 5/213

[56] References Cited

U.S. PATENT DOCUMENTS

| | | | |
|---|---|---|---|
| 4,551,753 | 11/1985 | Nishizawa | 348/446 |
| 4,833,543 | 5/1989 | Verbiest | 358/260 |
| 4,987,489 | 1/1991 | Hurley | 348/459 |
| 5,305,095 | 4/1994 | Song | 348/493 |
| 5,473,389 | 12/1995 | Eto | 348/670 |
| 5,493,513 | 2/1996 | Keith et al. | 364/514 R |
| 5,512,956 | 4/1996 | Yan | 348/606 |
| 5,592,231 | 1/1997 | Clatanoff | 348/446 |
| 5,835,630 | 11/1998 | Schweid | 382/173 |

FOREIGN PATENT DOCUMENTS

WO 96/42165  12/1996  WIPO .

OTHER PUBLICATIONS

Yongyi Yang et al., Regularized Reconstruction to Reduce Blocking Artifacts of Block Discrete Cosine Transform Compressed Images, IEEE Transactions on Circuit and Systems for Video Technology, vol. 3, No. 6., Dec. 1, 1993, pp. 421–432.

International Search Report (dated Jun. 16, 1999).

*Primary Examiner*—Mark R. Powell
*Assistant Examiner*—Wesner Sajous
*Attorney, Agent, or Firm*—Eric J. Robinson; Nixon Peabody LLP

[57] ABSTRACT

An S/N ratio is improved and flicker noises and mosquito noises are suppressed while deterioration of a resolution is suppressed. A three-dimensional cyclical digital filter (16) is interposed between a MPEG video decoder (12) and a video DAC. In accordance with a luminance input signal Yu from the MPEG video decoder (12), Yv is calculated from the following equation.

$$Yv = Ft - K \cdot (Ft - F(t-1))$$

where K is a value in the range of $0 \leq K < 1$, Ft is a present Yu input value, and $F(t-1)$ is a one-frame preceding Yv.

7 Claims, 4 Drawing Sheets

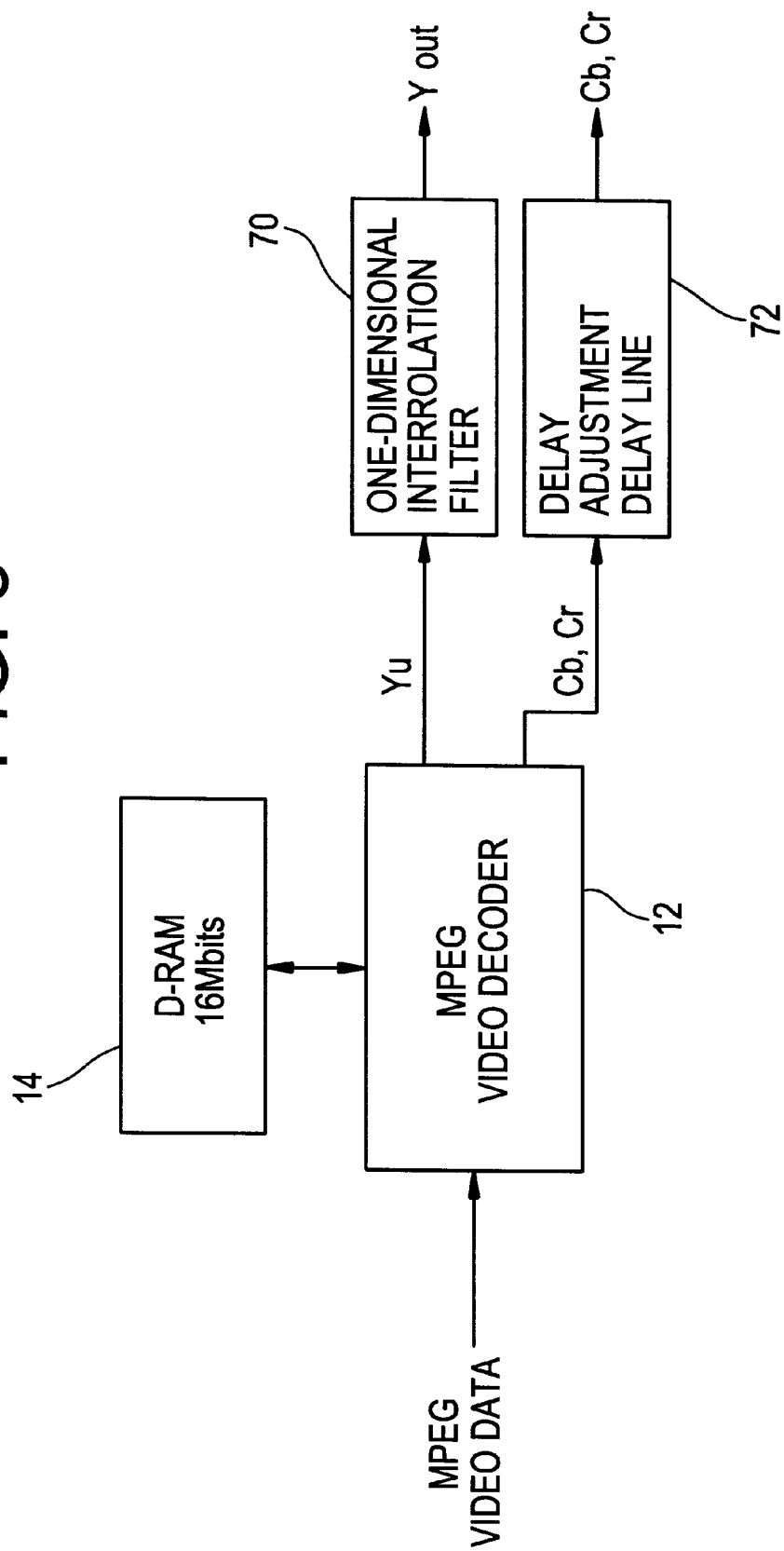

MULTI-DIMENSIONAL VIDEO FILTERS

BACKGROUND OF THE INVENTION

1. Field of the Invention

The present invention relates to a three-dimensional filter, a two-dimensional filter and a video filter apparatus capable of suppressing noises and distortions by correcting a luminance signal of a video decoder of, for example, MPEG.

2. Description of the Related Art

FIG. 8 is a block diagram showing conventional circuits of processing output signals from a MPEG video decoder 12. In FIG. 8, like elements to those of an embodiment of the invention are represented by using identical reference numerals and the detailed description thereof is omitted by explaining only the main points thereof. The MPEG video decoder 12 decodes MPEG video data and separately outputs a luminance signal Yu and color difference signals Cb and Cr. The luminance signal Yu is supplied to a one-dimensional interpolation filter 70 and the color difference signals Cb and Cr are supplied to a delay adjustment delay line 72 to be processed thereat and supplied to a television monitor (not shown) via a video DAC.

The problems associated with conventional video filter apparatuses are enumerated in the following.

(a) Generation of distortions if an encoder uses a high compression factor (e.g., a lot bit rate at about 3 Mbps), the distortions including:

horizontal and vertical direction block distortions in two-dimensional DCT, and mosquito noises; and flickers by motion compensation (using interframe difference).

(b) Generation of distortions caused by deteriorated input image sources themselves, the distortions including:

low S/N;

flickers, and random noises.

SUMMARY OF THE INVENTION

It is an object of the present invention to provide a three-dimensional video filter, a two-dimensional video filter, and a video filter apparatus capable of solving the above problems.

A three-dimensional video filter of this invention comprises:

(a) a three-dimensional calculation unit for calculating Yv by a following equation in accordance with a luminance input signal Yu from a video decoder, $$Yv(t)=Yu(t)-K \cdot (Yu(t)-Yv(t-1))$$

$$Yv(t)=Yu(t)-K \cdot (Yu(t)-Yv(t-1))$$

where K is a value in the range of $0 \leq K < 1$, Yu(t) is a present Yu value, and Yv(t) and Yv(t−1) are a present Yv value and one-frame preceding Yv value, respectively, and (b) a three-dimensional calculation output unit for outputting Yv as a corrected luminance signal to a video DAC.

The three-dimensional video filter is interposed between a video decoder and a video DAC. The three-dimensional calculation unit calculates Yv from Yu(t) which is a present luminance input value from the video decoder, and outputs it to the video DAC. Yv is a median value between the present input value and the one-frame preceding value Yv. In this manner, it becomes possible to improve an S/N ratio and suppress flicker noises and mosquito noises, while minimizing deterioration of a resolution.

In the three-dimensional video filter of this invention, the three-dimensional calculation unit increases the value K as the absolute value of Yu(t)−Yv(t−1)) becomes large.

Since the absolute value of (Ft−F(t−1)) is large as noises become large, K is increased to suppress a change in Yv. In this manner, a noise suppression efficiency can be improved.

A two-dimensional video filter of this invention comprises:

(a) an edge detecting unit for detecting an output timing of a luminance signal for a pixel at the edge portion of a block of a screen;

(b) a two-dimensional calculation unit for calculating Yw by a following equation in accordance with a luminance input signal Yu from a video decoder, $$Yw=\{B+K' \cdot (A+C)\}/(2K'+1)$$

where K' is a value in the range of $0 \leq K' < 1$, and A, B and C correspond to the luminance signals Yu of the video decoder for pixels a, b and c aligned traversing perpendicular to the edge of a block of a screen sequentially from the left side or upper side; and (c) a three-dimensional calculation output unit for outputting Yw as a corrected luminance signal to a video DAC if the pixel b is the pixel at the edge of the block.

The pixels a, b and c may be aligned consecutively or randomly (e.g., a, b and c pixels are selected at every second pixels). One of a or c pixel necessarily belongs to another block (62) different from the block of the b pixel.

The two-dimensional video filter is interposed between a video decoder and a video DAC. The two-dimensional calculation unit calculates Yw from Yu which is a luminance signal supplied from the video decoder, and outputs it to the video DAC at the luminance signal output timing of the b pixel, if the b pixel is the pixel at the edge of the block. Yw as the corrected luminance signal for the b pixel takes a filtered value of B and A, C, where A, B and C are Yu input values for a, b and c pixels supplied from the video decoder, and the b pixel is the central pixel among three consecutive pixels aligned traversing perpendicular to the edge of the block and the a and c pixels are positioned on both sides of the edge. In this manner, it becomes possible to suppress block distortions, while minimizing deterioration of a resolution.

In the two-dimensional video filter of this invention, the second-dimensional calculation unit increases the value K' as a bit rate value of video data from the video decoder becomes small.

The block distortions increase as the compression factor becomes high, i.e., as the bit rate value of video data supplied from the video decoder. Accordingly, as the bit rate value becomes small, the value K' is increased so that the corrected luminance signal for the b pixel takes a value more filtered relative to A and C. In this manner, block distortions to be caused by the bit rate value of video data can be effectively suppressed.

A video filter apparatus of the invention comprises:

(a) the three-dimensional video filter described above;

(b) the two-dimensional video filter described above; and (c) an adder for adding together the outputs of the three-dimensional video filter and the two-dimensional video filter and outputting an addition value to the video DAC as a corrected luminance signal.

By incorporating both the functions of the three-dimensional video filter and the two-dimensional video filter, it becomes possible to improve an S/N ratio suppress flicker and mosquito noises and block distortions, while minimizing deterioration of a resolution.

BRIEF DESCRIPTION OF THE DRAWINGS

FIG. 8 is a block diagram showing conventional circuits of processing output signals from a MPEG video decoder 12.

DETAILED DESCRIPTION OF THE PREFERRED EMBODIMENTS

Embodiments of the invention will be described with reference to the accompanying drawings.

Figure 1:
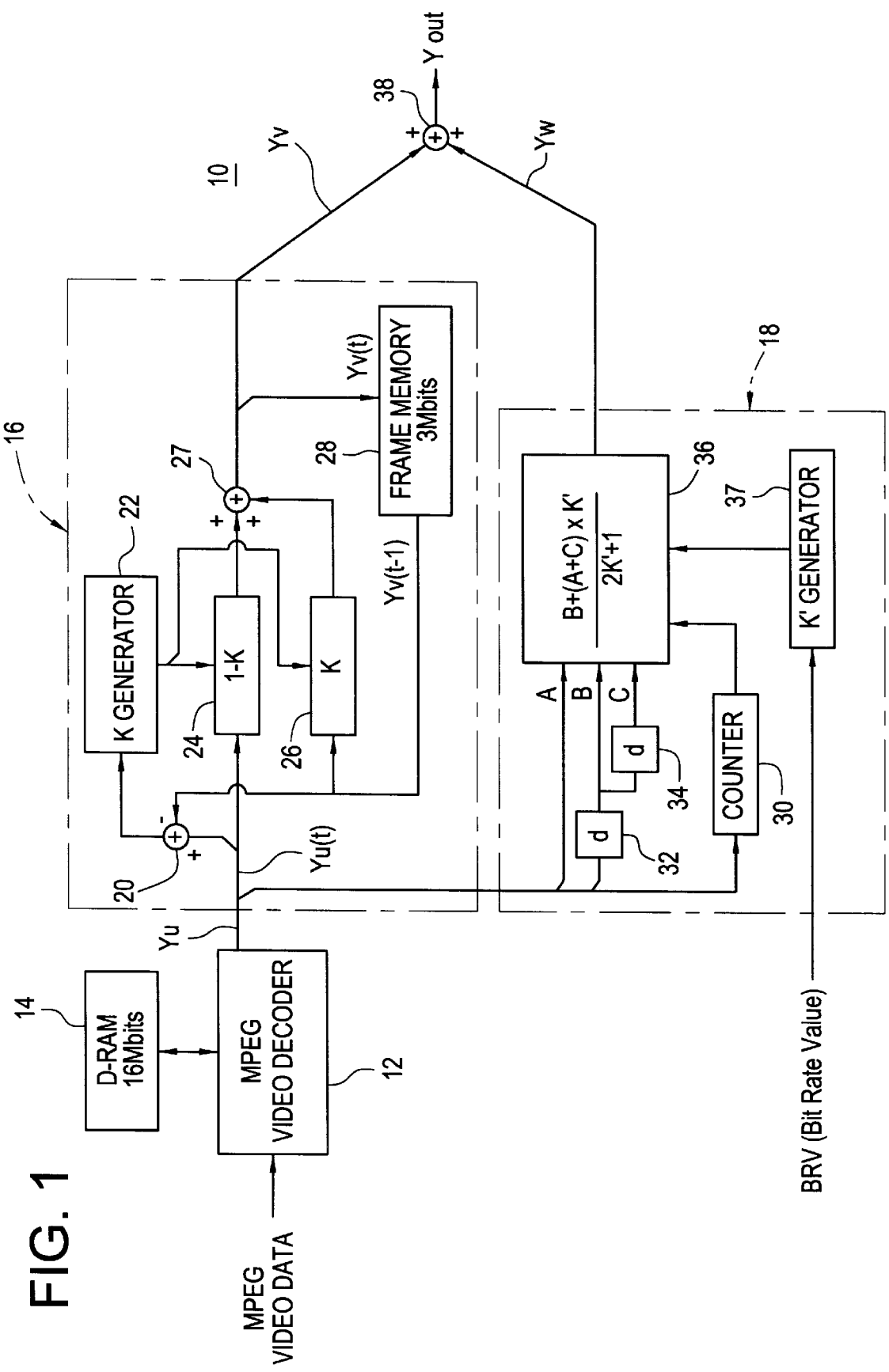
FIG. 1 is a block diagram showing a video filter apparatus.

FIG. 1 is a block diagram showing a video filter apparatus 10. The video filter apparatus 10 is interposed between a MPEG video decoder 12 and a video DAC (not shown), and is built with the MPEG video decoder 12, for example, on an IRD (Integrated Receiver Decoder), a DVD (Digital Video Disc), or a personal computer MPEG board. The video filter apparatus 12 includes a three-dimensional cyclical digital filter 16, a two-dimensional digital filter 18, and an adder 38. MPEG video data is derived from a signal input to a broadcast receiver as radiowave from a satellite or electrical signal from a cable. The derived video data is supplied to the MPEG video decoder 12. While transferring data between a D-RAM 14, the MPEG video decoder 12 processes the MPEG video data and generates a luminance signal Yu.

In the three-dimensional cyclical digital filter 16, an adder 20 calculates Yu(t): Yu as a present input value)−Yv(t−1) input from a frame memory 28). In accordance with a calculated value of the adder 20, a K generator 22 calculates K and outputs it to a (1−K) multiplier 24 and to a K multiplier 26. The (1−K) multiplier 24 multiplies Yu by (1−K). The K multiplier 26 multiplies an output F(t−1) of a frame memory 28 by K. An adder 27 adds the outputs of the (1−K) multiplier 24 and K multiplier 26 together and outputs an addition value Yv. The frame memory 28 has a storage capacity of 3 M bits and is used for outputting an one-frame preceding Yv as Yv(t−1) in accordance with an input Yv from the adder 27.

The output Yv of the adder 27 is given by the following equation (1):

$$Yv=(t)=Yu(t)-K\cdot(Yu(t)-Yv(t-1)) \quad (1)$$

where K is a value in the range of $0 \leq K < 1$, Yu(t) is a present Yu input value, and Yv(t) and Yv(t−1) are present Yv value and one-frame preceding Yv value, respectively.

Yv calculated by the equation (1) is an output of the three-dimensional cyclical digital filter 16. The K generator 22 generates a larger K as an absolute value of (Yu(t)−Yv(t−1)) becomes larger.

In the second-order digital filter 18, a calculator 36 is input with Yu from the MPEG video decoder 12 (1) directly, (2) via a delay line 32, or (3) via delay lines 32 and 34. A, B and C correspond to the Yu values to be input to the calculator 36 (1) directly, (2) via the delay line 32, or (3) via the delay lines 32 and 34, respectively. A counter 30 counts Yu from the MPEG video decoder 12 to detect whether the value calculated by the calculator 36 corresponds to which pixel 68 to be later described. A K' generator 37 calculates K' in accordance with a BRV (bit rate value) of the MPEG video data input to the MPEG video decoder 12, and outputs it to the calculator 36.

An output Yw of the calculator 36 is given by the following equation (2):

$$Yw=\{B+K'\cdot(A+C)\}/(2K'+1) \quad (2)$$

where K' is a value in the range of $0 \leq K' < 1$, and A, B and C are values to be detailed later with reference to FIGS. 4 to 7.

The calculator 36 detects from the detection signal by the counter 30 whether the output corresponds to a pixel 68 at which position, and outputs Yw having either the value calculated by the equation (2) or a value 0. The K' generator 37 generates a larger K' as BRV becomes smaller, i.e., as a compression factor of the MPEG video data becomes higher.

The adder 38 adds the value Yv input from the three-dimensional cyclical digital filter 16 to the value Yw input from the two-dimensional digital filter 18, and outputs an addition value Yout to a video DAC (not shown) which in turn converts Yout into an analog signal and outputs it to a television monitor (not shown).

Figure 2:
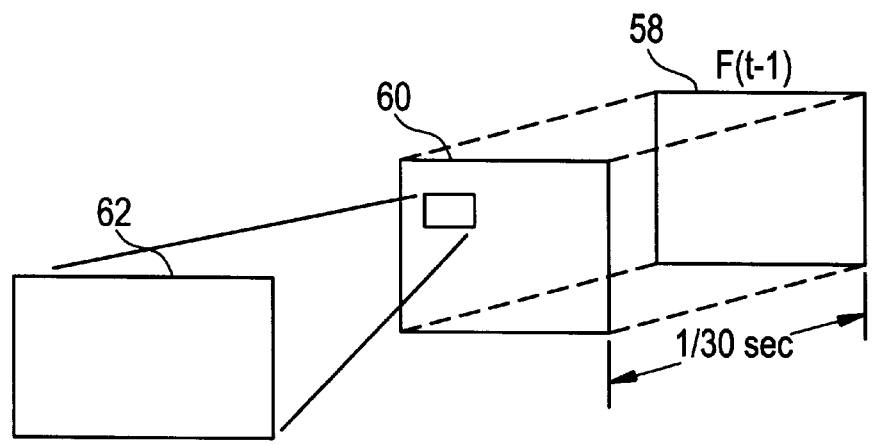
FIG. 2 is a diagram showing the relationship between a frame and a block.

FIG. 2 shows a relationship between a frame and a block. One frame corresponds to one screen. There is a time interval of 1/30 second between a one-frame preceding screen 58 and a current screen 60. One screen is divided, for example, into sixty four blocks 62 each constituted of a matrix of 8×8.

Figure 3:
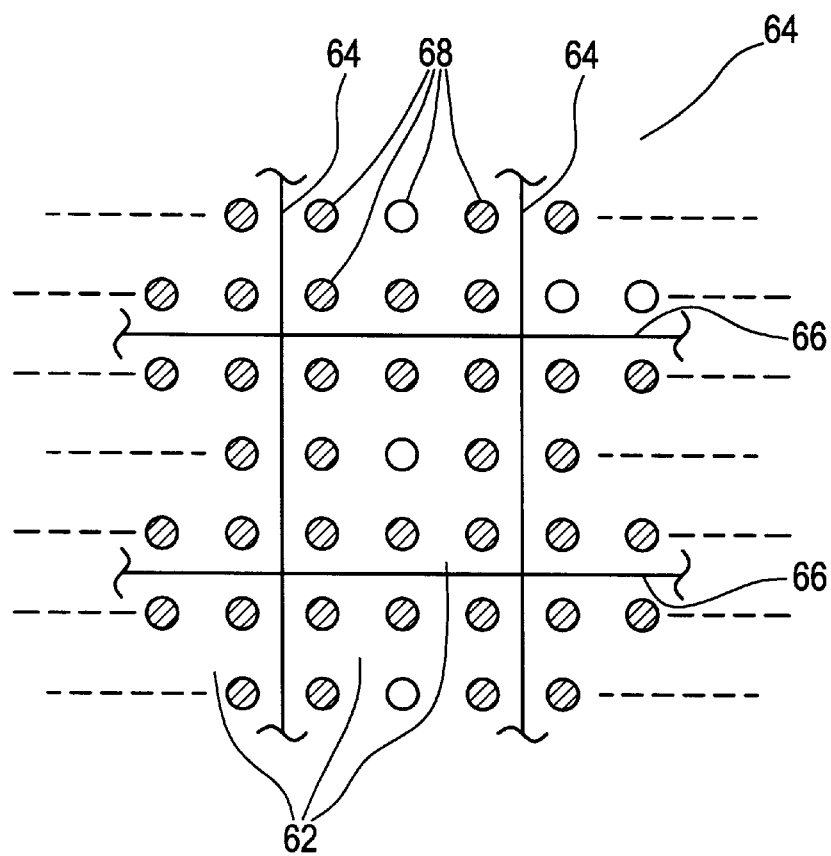
FIG. 3 is a diagram showing an arrangement of pixels in one screen.

FIG. 3 shows an arrangement of pixels 68 in the screen 60. The pixels 68 are arranged in a lattice shape in the screen 60. Each block 62 has 3×3 pixels. In MPEG, a DCT image dependent signal for each block is transmitted. Reference numerals 64 and 66 represent vertical and horizontal edges partitioning each block 62. In FIG. 3, pixels 68 at the periphery of the edge portion are shown hatched. In reproducing an image in a television monitor, a raster scan is performed from the upper left to lower right in the screen 60.

Figure 4:
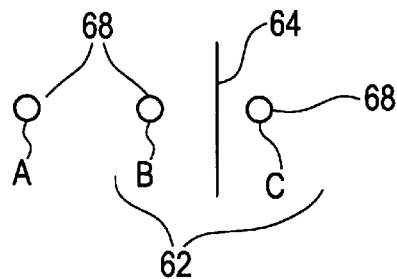
FIG. 4 is a diagram showing a first example of a two-dimensional digital filter shown in FIG. 1.

FIG. 4 is a diagram showing a first example of A, B and C of the second-dimensional digital filter 18 shown in FIG. 1. A, B and C correspond to the luminance signals Yu of the MPEG video decoder 12 for the second left, first left and first right pixels 68 relative to the vertical edge 64 of the three consecutive pixels in the horizontal same row. In this first example, the delay times of the delay lines 32 and 34 shown in FIG. 1 are set so that A, B and C for the three pixels 68 shown in FIG. 4 are input to the calculator 36.

Figure 5:
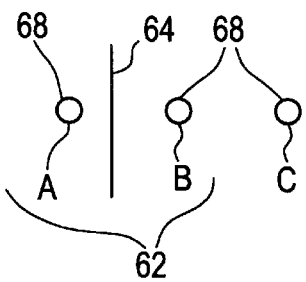
FIG. 5 is a diagram showing a second example of a two-dimensional digital filter shown in FIG. 1.

FIG. 5 is a diagram showing a second example of A, B and C of the second-dimensional digital filter 18 shown in FIG. 1. A, B and C correspond to the luminance signals Yu of the MPEG video decoder 12 for the first left, first right and second right pixels 68 relative to the vertical edge 64 of the three consecutive pixels in the horizontal same row. In this second example, the delay times of the delay lines 32 and 34 shown in FIG. 1 are set so that A, B and C for the three pixels 68 shown in FIG. 5 are input to the calculator 36.

Figure 6:
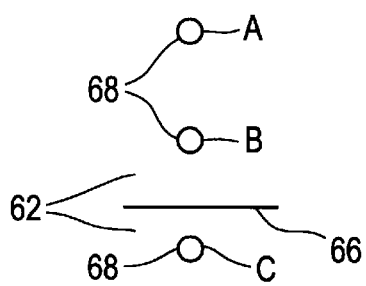
FIG. 6 is a diagram showing a third example of a two-dimensional digital filter shown in FIG. 1.

FIG. 6 is a diagram showing a third example of A, B and C of the second-dimensional digital filter 18 shown in FIG. 1. A, B and C correspond to the luminance signals Yu of the MPEG video decoder 12 for the second upper, first upper and first lower pixels 68 relative to the horizontal edge 66 of the three consecutive pixels in the vertical same column. In this third example, the delay times of the delay lines 32 and 34 shown in FIG. 1 are set so that A, B and C for the three pixels 68 shown in FIG. 6 are input to the calculator 36. These delay times are different from the first and second examples. Specifically, the delay times of the delay lines 32 and 34 are controlled by an output from the counter 30 so that they are switched between when the pixel 68 for B is at the periphery of the vertical edge and when it is at the periphery of the horizontal edge.

Figure 7:
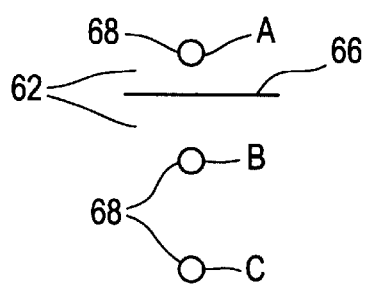
FIG. 7 is a diagram showing a fourth example of a two-dimensional digital filter shown in FIG. 1.

FIG. 7 is a diagram showing a fourth example of A, B and C of the second-dimensional digital filter 18 shown in FIG. 1. A, B and C correspond to the luminance signals Yu of the MPEG video decoder 12 for the first upper, first lower and second lower pixels 68 relative to the horizontal edge 66 of the three consecutive pixels in the vertical same column. In this fourth example, the delay times of the delay lines 32 and 34 shown in FIG. 1 are set so that A, B and C for the three pixels 68 shown in FIG. 7 are input to the calculator 36. These delay times are similar to the third example.

If the block 62 of the pixel 68 for B is at the corner of the screen, this block 62 is in contact with both the vertical and horizontal edges 64 and 66. Therefore, either B of the first or second example, or B of the third or fourth example may be used. Yw may be calculated in accordance with the following equation (3) by using four pixels 68 on both sides in the vertical and horizontal directions around the central pixel 68 for B and by preparing delay lines for the first and second examples of for the third and fourth examples.

$$Yw=\{B+K1'\cdot(A1+C1)+K1'\cdot(A2+C2)\}/(2K1'+2K2'+1)$$

where K1' and K2' are a value in the range of $0 \leq K1', K2' < 1$.

The operation of the video filter apparatus 10 will be described.

In accordance with an output of the counter 30, the calculator 36 of the two-dimensional digital filter 18 detects whether Yw to be presently output corresponds to a pixel 68 at which position. If Yw to be presently output corresponds to the pixel 68 at the edge portion of each block 62, i.e., to the pixel with hatching shown in FIG. 3 (hereinafter called "G1 pixel 68"), Yw having the value calculated by the equation (2) is output, whereas if Yw to be presently output corresponds to the pixel 68 other than the pixel 68 at the edge portion of each block 62, i.e., to the pixel without hatching shown in FIG. 3 (hereinafter called "G2 pixel 68"), Yw having the value of 0 is output. If the pixel 68 (hereinafter called "G3 pixel 68") at the edge portion in the block 62 at the side or corner of a television monitor has no adjacent block 62 with the vertical edge 64 or horizontal edge 66 being interposed therebetween, then neither A nor C is present so that the calculation by Yw by the equation (2) is impossible. In this case, Yw having the value of 0 is output similar to the case of Yw for the pixel 69 without hatching shown in FIG. 3.

Therefore, Yout for the G1 pixel 68 is Yout=Yv+Yw, and Yout for the G2 and G3 pixels 68 is Yout=Yv.

Yv takes a median value between the present input value Yu and the one-frame preceding value Yv. In this manner, it becomes possible to improve an S/N ratio and suppress flicker noises and mosquito noises, while minimizing deterioration of a resolution. The larger the noises, the larger the absolute value of (Yu(t)−Yv(t−1)) so that K increases to suppress a change in Yv. It is therefore possible to enhance a noise suppression efficiency.

Yout is used as a corrected luminance signal for the G1 pixel 68 and contains Yw calculated by the equation (2).

Therefore, as described with FIGS. 4 to 7, a difference of Yw from Yu is properly suppressed in accordance with Yu for the pixels 68 on both sides along the vertical edge 64 or horizontal edge 66 in contact with the subject pixel (one of the pixels 68 on both sides being the pixel 68 in the adjacent block 62). In this manner, it becomes possible to suppress block distortions while minimizing deterioration of a resolution. The block distortions are large as the compression factor becomes large, i.e., as BRV of the video data input to the MPEG video decoder 12 becomes small. In contrast, the K' generator generates a larger K' as BRV of the video data input to the MPEG video decoder 12 becomes small. It is therefore possible to generate the corrected luminance signal Yw so that a difference of this signal Yw for the pixel 68 of one of the two pixels on both sides along the vertical edge 64 or horizontal edge 66 can be reduced. In this manner, block distortions to be caused by BRV of video data can be properly processed.

What is claimed is:

1. A three-dimensional video filter comprising:
   (a) A three-dimensional calculation unit (22,24,26,27) for recursively calculating Yv by a following equation in accordance with a luminance input signal Yu from a video decoder (12), $$Yv(t)=Yu(t)-K\cdot(Yu(t)-Yv(t-1))$$

where K is a value in the range of $0 \leq K < 1$, Yu(t) is a present Yu input value, and Yv(t) and Yv(t−1) are a present Yv value and a one-frame preceding Yv value respectively; and
   (b) a three-dimensional calculation output unit for outputting Yv as a corrected luminance signal to a video DAC.

2. A three-dimensional video filter according to claim 1, wherein said three-dimensional calculation unit (22, 24, 26, 27) increases the value K as the absolute value of (Yu(t)−Yv(t−1)) becomes large.

3. A two-dimensional video filter comprising:
   (a) an edge detecting unit (30) for detecting an output timing of a luminance signal for a pixel (68) at the edge portion of a block (62) of a screen (60);
   (b) a two-dimensional calculation unit (32, 34, 36, 37) for calculating Yw by a following equation in accordance with a luminance input signal Yu from a video decoder (12), $$Yw=\{B+K'\cdot(A+C)\}/(2K'+1)$$

where K' is a value in the range of $0 \leq K' < 1$, and A, B and C correspond to the luminance signals Yu of the video decoder 12 for pixels a, b and c (68) aligned traversing perpendicular to the edge (64, 66) of a block (62) of a screen (60) sequentially from the left side or upper side; and
   (c) a three-dimensional calculation output unit for outputting Yw as a corrected luminance signal to a video DAC if the pixel b is the pixel (68) at the edge (62) of the block (60).

4. A two-dimensional video filter according to claim 3, wherein said second-dimensional calculation unit (32, 34, 36, 37) increases the value K' as a bit rate value of video data from the video decoder (12) becomes small.

5. A video filter apparatus comprising:
   (a) a three-dimensional calculation unit (22, 24, 26,27) for recursively calculating Yv by a following equation in accordance with a luminance input signal Yu from a video decoder (12), $$Yv(t)=Yu(t)-K\cdot(Yu(t)-Yv(t-1))$$

where K is a value in the range of $0 \leq K < 1$, Yu(t) is a present Yu input value, and Yv(t) and Yv(t−1) are a present Yv value and a one-frame preceding Yv value, respectively;

(b) a first three-dimensional calculation output unit for outputting Yv;

(c) an edge detecting unit (30) for detecting an output timing of a luminance signal for a pixel (68) at the edge portion of a block (62) of a screen (60);

(d) a two-dimensional calculation unit (32, 34, 36, 37) for calculating Yw by a following equation in accordance with a luminance input signal Yu from a video decoder (12), $$Yw=\{B+K'\cdot(A+C)\}/(2K'+1)$$

where K' is a value in the range of $0 \leq K' < 1$, and A, B and C correspond to the luminance signals Yu of the video decoder 12 for pixels a, b and c (68) aligned traversing perpendicular to the edge (64, 66) or a block (62) of a screen (60) sequentially from the left side or upper side;

(e) a second three-dimensional calculation output unit for outputting Yw if the pixel b is the pixel (68) at the edge (62) of the block (60); and (f) an adder (38) for adding together the outputs Yv and Yw of said first three-dimensional calculation output unit and said second three-dimensional calculation output unit and for outputting an addition value to the video DAC as a corrected luminance signal.

6. A video filter according to claim 5, wherein said three-dimensional calculation unit increases the value K as the absolute value of (Yu(t)−Yv(t−1)) becomes large.

7. A video filter according to claim 5 or 6, wherein said two-dimensional calculation unit increases the value K' as a bit rate value of video data from the video decoder becomes small.

* * * * *